3,004,202
Patented Oct. 10, 1961

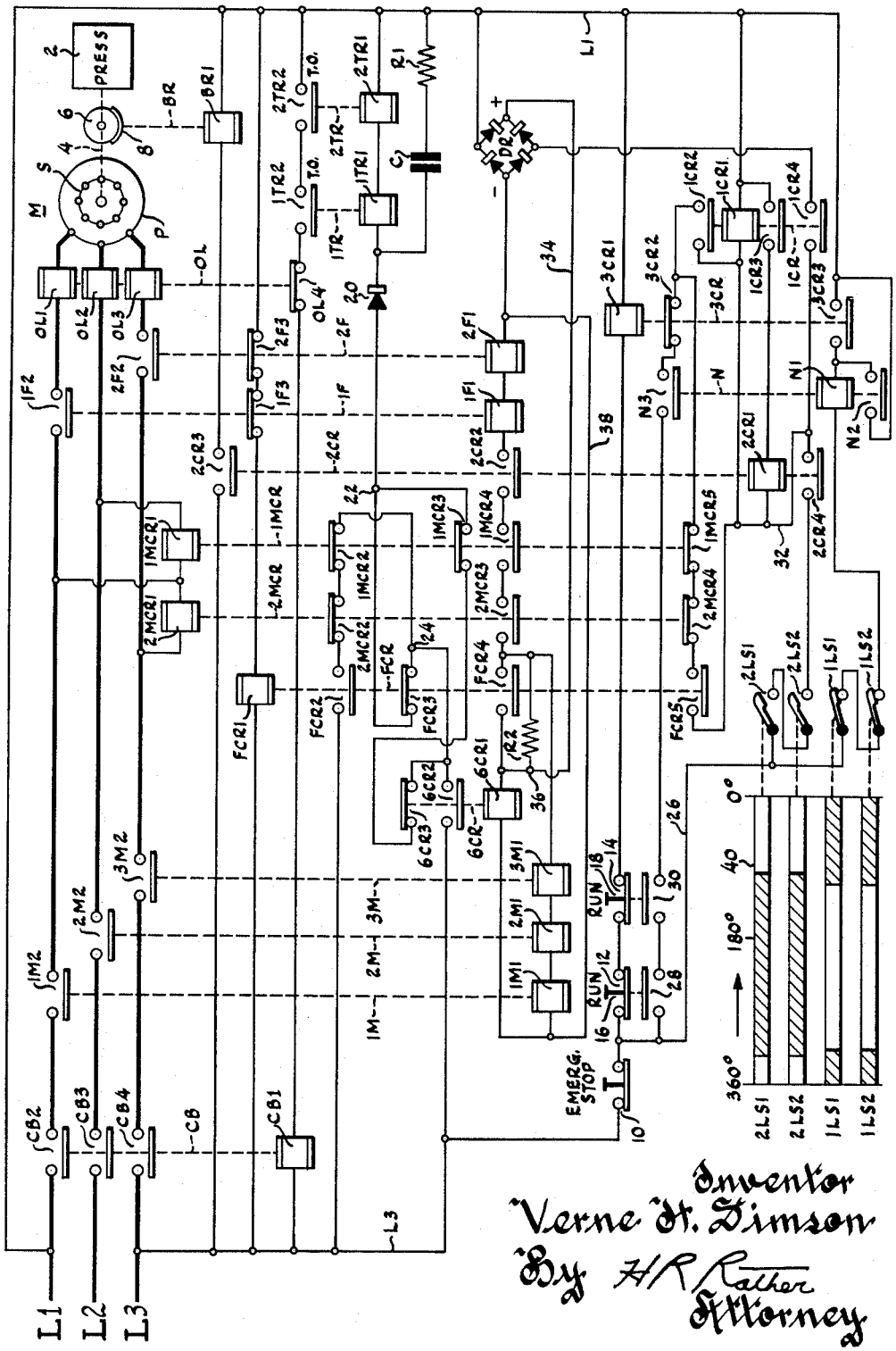

3,004,202
CYCLIC MACHINE CONTROL SYSTEM
Verne H. Simson, Milwaukee, Wis., assignor to Cutler-Hammer, Inc., Milwaukee, Wis., a corporation of Delaware
Filed July 2, 1957, Ser. No. 669,596
13 Claims. (Cl. 318—216)

This invention relates to cyclic machine control systems and safety apparatus therefor.

While not limited thereto, the invention is especially applicable to alternating current motor direct drive punch presses and the like wherein failure of the control system to stop the motor or to function in a predetermined manner might result in serious injury to personnel or damage to the machine.

On this type of press, the main drive motor is started and stopped with each operating cycle of the ram. This subjects the contactors which connect the motor directly across the line as well as the motor to very severe service. For purposes of safety, heretofore known systems have employed two-pole reversing contactors with a three-pole main contactor ahead of the latter for connecting the power supply source to the motor. Use of the aforementioned arrangement of contactors entails a considerable amount of interlocking requiring a large number of electrical interlocks in the control circuits of the contactors thereby introducing weak characteristics to electromagnetic switches which are otherwise long life devices. It is therefore desirable to provide a simplified motor control system having improved means which not only eliminate the aforementioned weak characteristics while retaining the interlocking functions but also afford protection against failure of any one of a maximum number of control devices in such system.

Accordingly, a primary object of the invention is to provide means affording the aforementioned and other improved results.

A more specific object of the invention is to provide a machine control system having improved electrical interlocking means.

Another object of the invention is to provide improved means affording maximum protection against failure of control devices in such system.

Another specific object of the invention is to provide an improved and simplified motor control system having incorporated therein means affording protection against failure of all operating elements of the system.

A further object of the invention is to provide improved means affording positive protection to personnel in the event of failure of motor power circuit elements in such control system.

Further objects and advantages of the invention will hereinafter appear.

While the invention hereinafter described is effectively adapted to fulfill the objects stated, it is to be understood that I do not intend to confine my invention to the particular preferred embodiment of motor control system disclosed inasmuch as it is susceptible of various modifications without departing from the scope of the appended claims.

The single figure of the drawing diagrammatically illustrates a motor control system constructed in accordance with the present invention.

Referring to the drawing, there is shown a three-phase induction motor M of the squirrel cage type or the like having a primary winding P and a secondary winding S. A three-phase power supply source is connectible to the primary winding P of motor M through the usual on-off switches (not shown) to lines L1, L2 and L3 and then through normally open contacts CB2-4 of a circuit breaker CB, normally open contacts 1M2, 2M2 and 3M2 of main contactors 1M, 2M and 3M, respectively, normally open contacts 1F2 and 2F2 of forward contactors 1F and 2F and through operating coils OL1, OL2 and OL3, respectively, of overload relay OL to primary winding P. Motor M is connected to drive press 2 through a shaft 4. An electromagnetic brake is interposed between the motor and the press and has a brake drum 6 connected to shaft 4. Spring applied brake shoe 8 is operated in the usual manner by the brake mechanism BR.

The control system shown in the lower portion of the drawing is provided with a forward control relay FCR having an operating coil FCR1 connected across lines L1 and L3 through normally closed contacts 1F3 and 2F3 of the respective forward contactors 1F and 2F. A control relay 3CR has an operating coil 3CR1 connected across lines L1 and L3 through a normally closed emergency Stop switch 10 and normally closed contacts 12 and 14 of Run switches 16 and 18, respectively. Run switches 16 and 18 are preferably mounted sufficiently spaced apart as a safety measure to occupy both hands of the operator and thus to prevent accidentally placing the latter in the machine while in operation. A pair of timing relays 1TR and 2TR have their operating coils 1TR1 and 2TR1, respectively, series connected in a circuit extending from line L1 through a half-wave rectifier 20 to a common point 22 where the circuit divides. One branch extends through normally closed contacts FCR3 to a common point 24 while another branch extends through normally closed contacts 1MCR3 of an interlocking relay 1MCR and normally closed contacts 6CR3 of control relay 6CR to point 24, the latter being connected to line L3 on one hand through normally open contacts 6CR2 and in a parallel path on the other hand through normally closed contacts 1MCR2 and 2MCR2 and normally open contacts FCR2. Resistor R1 and capacitor C are series connected in shunt of the operating coils 1TR1 and 2TR1 of the timing relays. Timing relays 1TR and 2TR are provided with this capacitor-resistor shunt circuit to afford timed opening of contacts 1TR2 and 2TR2 in the energizing circuit of a circuit breaker CB. Circuit breaker CB has an undervoltage coil CB1 connected across lines L1 and L3 through normally closed contacts OL4 of overload relay OL, normally open contacts 1TR2 of timing relay 1TR and normally open contacts 2TR2 of timing relay 2TR.

A "non-repeat" relay N is provided having an operating coil N1 connected across lines L1 and L3 through Stop switch 10, conductor 26, normally closed limit switches 1LS1 and 1LS2 and normally open contacts 3CR3 of the aforementioned control relay 3CR. Relay N is provided with normally open contacts N2 for establishing a holding circuit for itself in shunt of contacts 3CR3 when the relay is energized. A control relay 1CR is provided having an operating coil 1CR1 connected across lines L1 and L3 through Stop switch 10, normally open contacts 28 of Run switch 16, normally open contacts 30 of Run switch 18, normally open contacts N3 of relay N, normally closed contacts 3CR2 of relay 3CR, normally closed contacts 1MCR5 and 2MCR4 of interlocking relays 1MCR and 2MCR, respectively, and normally open contacts FCR5. Control relay 1CR is provided with normally open contacts 1CR2 for establishing a holding circuit for itself in shunt of contacts 1MCR5, 2MCR4 and FCR5. A control relay 2CR is provided having an operating coil 2CR1, series connected with normally open contacts 1CR3 of control relay 1CR in shunt of the operating coil of the latter for energization in response to energizing of the operating coil of relay 1CR and closure of its contacts 1CR3.

A full-wave rectifier bridge DR is connected at its input terminals across lines L1 and L3 through normally open contacts 1CR4 of control relay 1CR, conductor 32, contacts FCR5, 2MCR4, 1MCR5, 3CR2, N3, 30 and 28 and Stop switch 10. The aforementioned holding circuit for relay 1CR through its contacts 1CR2 also acts to maintain energization of the operating coil 2CR1 of relay 2CR and rectifier bridge DR as will hereinafter appear. A further circuit for maintaining energization of rectifier bridge DR is provided through contacts 1CR4, normally open contacts 2CR4 of control relay 2CR, normally open limit switches 2LS1 and 2LS2, conductor 26 and Stop switch 10, the latter circuit through switch 10, limit switches 2LS1 and 2LS2 and contacts 2CR4 also providing a holding circuit for the operating coils of relays 1CR and 2CR as will be apparent.

Operating coils 1M1, 2M1 and 3M1 of the respective main contactors are series connected with a resistor R2 across the positive and negative output terminals of rectifier bridge DR. Operating coil 6CR1 of the aforementioned control relay 6CR is also connected across the positive and negative output terminals of rectifier bridge DR. Similarly, operating coils 1F1 and 2F1 of the aforementioned forward contactors 1F and 2F are series connected with normally open contacts 2CR2, 1MCR4 and 2MCR3 and resistor R2 across the output terminals of bridge DR. The aforementioned circuit may be traced from the right-hand positive terminal of rectifier bridge DR through conductor 34 to common point 36 where it divides. One branch extends through operating coil 6CR1 and conductor 38 to the negative terminal of bridge DR; another branch extends through resistor R2, operating coils 1M1, 2M1 and 3M1 and conductor 38 to the negative terminal of bridge DR; while a third branch extends through resistor R2, contacts 2MCR3, 1MCR4 and 2CR2 and operating coils 1F1 and 2F1 to the negative terminal of bridge DR. Normally open contacts FCR4 of relay FCR are connected to shunt resistor R2 effectively out of the circuit for reasons more fully described hereinafter. The aforementioned interlocking relays 1MCR and 2MCR have their operating coils connected across lines L1—L2 and L1—L3, respectively, between the contacts of the main and forward contactors. Although reversing contactors in addition are employed in actual practice, they have been omitted herein as unnecessary for description and understanding of the present invention.

Press 2 is of the direct drive type. The press operates when motor M operates and is stopped when the motor is stopped. The control circuit is arranged for non-repeat operation of the press. That is, the press operator must operate the Run switches to initiate each cycle of operation of the press and he must release the Run switches before another cycle of press operation can be initiated by again pressing these switches.

The control circuit hereinbefore described comprises three portions. One portion contains the main motor contactors 1M, 2M and 3M, motor forward contactors 1F and 2F and control relay 6CR; these contactors and relay being energized by unidirectional output current from rectifier bridge DR.

The flow of alternating current input power to rectifier bridge DR and the energization of brake BR are controlled by the second or "non-repeat" portion of the control circuit. This portion comprises relays 1CR, 2CR, 3CR and N, Run switches 16 and 18, stop switch 10 and limit switches 1LS1, 1LS2, 2LS1 and 2LS2.

The third portion of the control circuit functions to insure that the motor is stopped in the event that some part or component of the control circuit should malfunction. This portion comprises undervoltage circuit breaker CB, forward control contactor FCR, main control or interlocking relays 1MCR and 2MCR, timing relays 1TR and 2TR, half-wave rectifier 20, capacitor C, resistor R1 and overload relay OL.

The limit switches shown in the lower left-hand portion of the drawing are connected to the press 2 and motor M directly or indirectly and are mechanically or electrically operated in accordance with the movement of the press ram. Diagram 40 depicts the operating characteristics of the limit switches shown at the right-hand end thereof for one full cycle of the press. The shaded areas depict the closed conditions of the corresponding limit switches whereas the unshaded areas depict the open conditions thereof. Diagram 40 is a layout development of a cam or the like type of limit switch actuator operable from zero degrees to 360 degrees in the direction of the arrow during each complete cycle of and conjointly with the press. The right and left-hand ends of diagram 40, marked zero and 360 degrees, respectively, indicate the uppermost position of the press ram. The central 180 degree point indicates the lowermost position of the ram.

The reversing circuit, inching circuit and various signal light and other auxiliary circuits have been omitted from the drawing to avoid complicating the latter and because they do not change the essential character of the invention.

Let it be assumed that the aforementioned on-off switches are closed to supply three-phase alternating current power to lines L1–3. A circuit is completed for energizing operating coil FCR1 of relay FCR from line L3 through contacts 1F3 and 2F3 to line L1. A circuit is also completed from line L3 through Stop switch 10, contacts 12 and 14 of the Run switches and operating coil 3CR1 to line L1 for energizing control relay 3CR. Relay FCR energizes and closes contacts FCR2 to energize operating coils 1TR1 and 2TR1 of the timing relays in a circuit extending from line L3 through contacts FCR2, 2MCR2 and 1MCR2, point 24, contacts 6CR3 and 1MCR3, point 22 and rectifier 20 to line L1. Timed opening contacts 1TR2 and 2TR2 close and energize the undervoltage coil CB1 of circuit breaker CB in a circuit extending from line L3 through contacts OL4, 1TR2 and 2TR2 to line L1. Circuit breaker CB closes contacts CB2–4 to prepare an energizing circuit to the motor primary winding P to be completed as hereinafter described.

The aforementioned energization of relay FCR also opens contacts FCR3 in shunt of normally closed contacts 6CR3 and 1MCR3 in the timing relay circuit to provide a safety feature hereinafter described. Furthermore, contacts FCR4 close to shunt resistor R2 effectively out of circuit with the main and forward power contactors to provide a higher voltage for rapid energization of the latter as hereinafter described. Contacts FCR5 close a point in the energizing circuit of control relay 1CR.

Upon energization of relay 3CR as heretofore described, contacts 3CR2 open to prevent operation of control relay 1CR until the Run switches are pressed, and contacts 3CR3 close to complete an energizing circuit for operating coil N1 of relay N. This circuit may be traced from line L3 through switch 10, conductor 26, limit switches 1LS1 and 1LS2, and contacts 3CR3 to line L1. Relay N closes contacts N2 to complete a holding circuit in shunt of contacts 3CR3. Contacts N3 close a further point in the energizing circuit of control relay 1CR.

The control system is now in a preparatory condition wherein operation of the press can be initiated by pressing Run switches 16 and 18. Pressing Run switch 16 results in opening of contacts 12 and closure of contacts 28 while pressing Run switch 18 opens contacts 14 and closes contacts 30. Opening of contacts 12 and 14 interrupts the energizing circuit of operating coil 3CR1 to release relay 3CR. Contacts 3CR3 open with no effect because relay N is maintained energized at contacts N2. Closure of contacts 3CR2 completes a further point in the energizing circuit of relay 1CR. Upon the closure of contacts 28 and 30 of the Run switches, operating coil 1CR1 is energized in a circuit extending from line L3, switch 10 and contacts 28, 30, N3, 3CR2, 1MCR5, 2MCR4 and FCR5 to line L1. Contacts 1CR2 close to complete a holding circuit in shunt of contacts FCR5, 2MCR4 and 1MCR5, and contacts 1CR3 close to complete an energizing circuit for operating coil 2CR1 of control relay 2CR in parallel with the operating coil of relay 1CR. Closure of contacts 1CR4 results in energization of rectifier bridge DR in a circuit extending from line L3 through the aforetraced circuit to operating coils 1CR1 and 2CR1 and then through conductor 32, contacts 1CR4 and the input terminals of rectifier bridge DR to line L1. Control relay 2CR being energized closes contacts 2CR2 to complete a point in the energizing circuit of the forward contactors, and closes contacts 2CR4 to close a point in a maintaining circuit for rectifier bridge DR to be subsequently completed. Relay 2CR also closes contacts 2CR3 to energize brake winding BR1 across lines L1–3 to disengage brake shoe 8 from drum 6.

In the meantime power is supplied to the primary winding P of motor M to start the motor in the following manner. Upon the aforementioned energization of rectifier bridge DR, relay 6CR and main contactors 1M, 2M and 3M are energized in parallel in a circuit extending from the positive output terminal of bridge DR, conductor 34 to point 36 where it divides. One branch extends through coil 6CR1 to conductor 38 while another branch extends through contacts FCR4, coils 1M1, 2M1 and 3M1 and conductor 38 to the negative output terminal of bridge DR. Relay 6CR closes contacts 6CR2 to complete a holding circuit for the timing relays in shunt of contacts FCR2, 2MCR2 and 1MCR2, and opens contacts 6CR3. As will be apparent, opening of contacts 6CR3 interrupts the energizing and holding circuits of the timing relays. However, the timing relays are provided with capacitor C and resistor R1 to render contacts 1TR2 and 2TR2 slow-to-open, thus to prevent circuit breaker CB from disconnecting the motor in the short interval of time before contacts FCR3 reclose the timing relay energizing circuit, as hereinafter described.

Upon being energized, the main contactors close their respective contacts 1M2, 2M2 and 3M2 to complete a further point in the power connections to the motor primary winding P. Closure of the last mentioned contacts completes energizing circuits therethrough, and through contacts CB2–4 of circuit breaker CB to operating coils 2MCR1 and 1MCR1 of interlocking relays 2MCR and 1MCR, respectively. Relays 1MCR and 2MCR open contacts 1MCR2 and 2MCR2 to further interrupt the energizing circuit of the timing relays, and open contacts 1MCR5 and 2MCR4 with no effect as relay 1CR is maintained through contacts 1CR2. Relay 1MCR opens contacts 1MCR3 with no effect as contacts 6CR3 in series therewith are already open. Furthermore, relays 1MCR and 2MCR close contacts 1MCR4 and 2MCR3 to complete an energizing circuit for operating coils 1F1 and 2F1 of forward contactors 1F and 2F. This circuit extends from the positive output terminal of rectifier bridge DR through conductor 34, point 36, contacts FCR4, 2MCR3, 1MCR4 and 2CR2 and coils 1F1 and 2F1 to the negative output terminal of bridge DR. Contactors 1F and 2F close their contacts 1F2 and 2F2 to complete the power connections for motor M to start the latter, and open contacts 1F3 and 2F3 to interrupt the circuit of forward control relay FCR and deenergize operating coil FCR1. Relay FCR closes contacts FCR3 to reestablish a holding circuit for the timing relays before the latter have timed out, extending from line L3 through contacts 6CR2, point 24, contacts FCR3, point 22 and rectifier 20 to line L1. Contacts FCR2 and FCR5 open without effect while contacts FCR4 open to reinsert resistor R2 effectively in the energizing circuit of the main and forward contactors.

The function of resistor R2 is to afford a voltage drop to decrease the voltage on and protect operating coils 1M1, 2M1 and 3M1 of the main contactors and operating coils 1F1 and 2F1 of the forward contactors from high voltage. Resistor R2 also decreases the current in the main and forward contactor operating coil circuits to afford rapid deenergization of the latter at the end of the operating cycle of the press as hereinafter described.

Motor M thus being energized operates press 2 through shaft 4. Let it be assumed that the limit switch actuator 40 shown in the lower left-hand portion of FIG. 1 operates from zero degrees to 360 degrees conjointly with one cycle of the press ram. When the ram reaches a position short of its lowermost position, limit switches 2LS1 and 2LS2 close as depicted by the upper two and like shaded portions to the left of these switches. Closure of limit switches 2LS1 and 2LS2 completes the aforementioned circuit for maintaining rectifier bridge DR energized independently of the Run switches in a circuit extending through Stop switch 10, conductor 26 and contacts 2CR4 and 1CR4. The main and forward contactors and relay 6CR are also maintained energized across the output terminals of the rectifier bridge. Moreover, conductor 32, being connected to the junction of contacts 2CR4 and 1CR4 applies the aforementioned maintaining circuit to operating coil 1CR1 or relay 1CR and through contacts 1CR3 of the latter to operating coil 2CR1 of relay 2CR.

The Run switches 16 and 18 may now be released without stopping the press. It should be observed, however, that the press can be stopped at any position of its cycle by depressing Stop switch 10 as will be apparent. Release of the Run switches results in opening of contacts 28 and 30 without effect and closure of contacts 12 and 14 to complete an energizing circuit for operating coil 3CR1 of relay 3CR. Contacts 3CR2 open and contacts 3CR3 close without effect at this time. The press ram is sufficiently near its lowermost position at this time to preclude the danger of the operator placing his hands thereunder.

When the press ram reaches a further position depicted by the lower two and like unshaded portions to the left of limit switches 1LS1 and 1LS2, the latter open to deenergize the operating coil of relay N, opening contacts N2 and N3. The latter contacts perform no useful function at this time because the Run switches were heretofore released. Subsequent closure of limit switches 1LS1 and 1LS2 when the ram reaches a position indicated by the two lower, left-hand shaded portions to the left of these switches results in reenergization of relay N and closing of contacts N2 and N3, contact N2 reestablishing the aforementioned holding circuit in shunt of contacts 3CR3. When the press ram approaches its uppermost position at the end of the cycle, limit switches 2LS1 and 2LS2 open to stop the press. Opening of limit switches 2LS1 and 2LS2 interrupts the circuit through Stop switch 10, conductor 26 and contacts 2CR4 and 1CR4 whereby rectifier bridge DR and relays 1CR and 2CR were maintained energized. Relays 1CR and 2CR deenergize. Main contactors 1M, 2M and 3M, forward contactors 1F and 2F and control relay 6CR which were fed through bridge DR deenergize. The main and forward contactors interrupt the motor power connections while control relay 2CR opens contacts 2CR3 to deenergize brake winding BR1 whereupon brake shoe 8 is spring applied to stop the motor and press. Forward contactors 1F and 2F reestablish the energizing circuit of relay FCR through contacts 1F3 and 2F3 while interruption of the motor power connections by the main contactors also interrupts the energizing circuits for relays 1MCR and 2MCR to deenergize the latter. This returns the control system to the aforementioned preparatory condition, wherein relays FCR, 3CR, 1TR, 2TR and N and circuit breaker CB are energized while the remaining contactors and relays are deenergized. Thus it is seen that for each time that Run switches 16 and 18 are pressed, the press operates through one complete cycle and automatically stops at the end thereof.

Limit switches 1LS1 and 1LS2 provide the non-repeat function wherein the press automatically stops at the end of each cycle even in the event the Run switches are not released. Should the Run switches be held depressed, limit switches 1LS1 and 1LS2 open as before when the press ram approaches its lowermost position to deenergize relay N. Contacts N2 interrupt its holding circuit while contacts N3 interrupt the initial energizing circuit of control relays 1CR and 2CR and rectifier bridge DR. Now when limit switches 1LS1 and 1LS2 reclose near the end of the cycle, relay N does not reenergize because the Run switches are depressed, relay 3CR is deenergized and contacts 3CR3 in the circuit of relay N are open. As the press ram is driven further, limit switches 2LS1 and 2LS2 open to release the system, interrupt the motor power connections and apply the brake as heretofore described. Thus, it will be apparent that automatic stopping is afforded at the end of each cycle of the press ram when the Run switches are pressed and released in the normal manner and also in the event the Run switches are pressed and held depressed throughout the cycle. It will also be apparent that in the latter case the press cannot be restarted unless the Run switches are released to energize relay N following energization of relay 3CR and then pressed again to initiate another cycle of operation.

Operating "on the hop" describes a repeat operation, that is, operating the press through a plurality of successive cycles without interruption, obtained by timed manipulation of the Run switches by an experienced operator. This is obtained by releasing the Run switches after limit switches 2LS1 and 2LS2 have closed and reoperating them during a subsequent interval of time. Relay 3CR energizes upon release of the Run switches and closes contacts 3CR3 to prepare an energizing circuit for relay N. Near the end of the punch press cycle during the interval of time between the closure of limit switches 1LS1 and 1LS2 and the opening of limit switches 2LS1 and 2LS2, the operator presses the Run switches. Closure of limit switches 1LS1 and 1LS2 reenergizes relay N which closes contacts N2 to maintain its energization and closes contacts N3 to prepare the initial energizing circuit for relay 1CR. As the Run switches are pressed, contacts 12 and 14 open to deenergize relay 3CR thereby to close a further point in the aforementioned initial energizing circuit at contacts 3CR2, and contacts 28 and 30 close to complete the initial energizing circuit for relay 1CR. Thus, subsequent opening of limit switches 2LS1 and 2LS2 near the end of the cycle does not result in interruption of the system and motor operation is maintained for a repeat cycle. It will be noted that in order to obtain operation "on the hop," the Run switches must be pressed during the aforementioned interval but after relay N has reenergized.

The press can be stopped at any position of its operating cycle by momentarily pressing emergency Stop switch 10 to release the control system as heretofore described. The inching apparatus which would then be employed to operate the press ram to its uppermost position has been omitted herein as unnecessary to the present invention.

An essential feature of the invention resides in the provision of circuits and arrangements affording utmost safety to the press as well as to operating personnel.

Two manual Run switches are employed to occupy both hands of the operator until the press ram approaches its lowermost position to an extent that there is no longer danger of the operator placing a hand under the ram. Two series connected limit switches are employed in each case so that failure of one thereof will not prevent automatic stopping of the press. Moreover, two timing relays are provided to insure that failure of one to time out will not prevent release of the circuit breaker by the other.

The most dangerous thing from the safety standpoint is that the control does not function to stop the press when required. In order to insure that the press does stop under such conditions, two sets of contactors, main and forward, are employed in the motor power circuit. In addition, interlocking arrangements are provided in the timing relay circuit. The elements which indicate that the motor power switches operate in the required manner are arranged to be fail-safe, that is, any failure on the part of these indicators will not prevent protection against such failure so as to cause the press to keep running. In this connection two assumptions have been made: (1) that two failures will not occur simultaneously and (2) that all parts of the relays operate together, that is, when normally open contacts close, normally closed contacts open and vice versa. For additional safety, assumption (2) has not been extended to the main and forward contactors as protection is afforded against partial failure of the latter.

As will hereinafter appear, the system is fail safe under all abnormal conditions, that is, under certain abnormal conditions the circuit will stop the motor while under other abnormal conditions the motor will not start at all. Initially relays FCR, 3CR, 1TR, 2TR and N and circuit breaker CB are energized preparatory to starting the motor, as heretofore described. Of course, if any one of these elements initially fails to operate, the motor will not start at all.

Let it be assumed that the system is in the aforementioned preparatory condition and that the Run switches are pressed to initiate starting of the motor. In the following description, the term "close" when used in connection with an electromagnetic device will be understood to have reference to closure of normally open contacts and opening of normally closed contacts of such electromagnetic device while the term "open" will be understood to mean the reverse of "close," that is, opening of normally open contacts and closure of normally closed contacts of such device. Failure to close or open may be due to malfunctioning of any part of such device.

When starting the press:

If relay 6CR fails to close, the energizing circuit of operating coils 1TR and 2TR of the timing relays will remain open at contacts 6CR2 and 1MCR2 and 2MCR2. After a predetermined time delay, the timing relays will interrupt the energizing circuit of the undervoltage coil of circuit breaker CB to open the latter and stop the press.

If either main contacts 2M2 or 3M2 fail to close, the motor will not start; and the circuit breaker opens because contacts 6CR3 and FCR3 remain open to open the timing relays.

If main contacts 1M2 fail to close, the motor will not start.

If either relay 1MCR or 2MCR fails to close, the motor will not start; and the circuit breaker opens because contacts 6CR3 and FCR3 remain open as before.

If either contacts 1F2 or 2F2 fail to close, the motor will not start.

If either contacts 1F3 or 2F3 fail to open, the circuit breaker opens because contacts 6CR3 and FCR3 remain open.

If relay FCR fails to open, the circuit breaker opens because contacts 6CR3 and FCR3 remain open as before.

When stopping the press:

If relay 6CR fails to open, the circuit breaker opens because contacts 6CR3 and FCR3 remain open.

If either contacts 1F2 or 2F2 fail to open, the main contactors stop the press.

If either contacts 1F3 or 2F3 fail to close, the circuit breaker disconnects the motor because contacts 6CR2 and FCR2 remain open.

If any of the main contacts 1M2, 2M2 or 3M2 fail to open, the forward contactors will stop the motor.

If main contacts 2M2 or 3M2 fail to open, the motor will stop; and the circuit breaker opens because relays 1MCR and 2MCR remain energized and contacts 6CR2, 2MCR2, 1MCR2, FCR3 and 1MCR3 remain open in the timing relay circuits.

If relay 1MCR fails to open, the circuit breaker disconnects the motor because contacts 1MCR2 and 6CR2 remain open.

If relay 2MCR fails to open, the circuit breaker disconnects the motor because contacts 6CR2 and 2MCR2 remain open in the timing relay circuit.

If relay FCR fails to reclose, the circuit breaker disconnects the motor because contacts 6CR2 and FCR2 remain open in the timing relay circuit.

Finally, if an overload, or unbalanced condition occurs in the motor power circuit, contacts OL4 open the main circuit breaker.

Thus it should be apparent that the invention provides a fail-safe cyclic machine control system that not only affords protection to personnel by preventing a continuous running condition of the machine should control devices malfunction but also protects the machine from damage by work pieces lodged therein. Moreover, the invention provides for opening of the main circuit breaker in the event of failure of one of the motor power contactors, as for example, welding of the contacts, to afford positive protection to personnel not heretofore obtained.

I claim:

1. In a cyclic machine control system having first and second electroresponsive switches which must be closed to connect power therethrough to energize the machine and means responsive to initiation of operation of the machine for closing said first switch, in combination, means responsive to closure of said first switch for closing said second switch to effect one cycle of operation of the machine, means responsive to termination of said one cycle for automatically opening said switches, and means responsive to a failure of either the second or third mentioned means to operate properly for stopping the machine.

2. In a control system for an electrical motor driven machine which system comprises electroresponsive control devices initially operable preparatory to manually initiating operation of the machine, and manual means for initiating such operation, the combination with electroresponsive means responsive to said manual means for connecting power to the motor for operating the latter, follower means responsive to a predetermined driven movement of the machine for initiating stopping of the latter, means comprising said electroresponsive means and responsive to said follower means for disconnecting power from the motor to effect stopping of the latter and a main power circuit breaker, of means responsive to failure of any portion of said electroresponsive means to function in a predetermined manner for operating said circuit breaker.

3. The combination according to claim 2, wherein the last mentioned means comprises timing means for operating said circuit breaker a predetermined time interval after occurrence of such failure, said time interval being longer than the difference in the normal operating times of said electroresponsive means to prevent inadvertent operation of said circuit breaker.

4. In a cyclic control system for an electrical motor driven machine which system comprises first and second electroresponsive switches which must be closed to effect operation of the machine and means responsive to initiation of operation of the machine for closing said first switch, in combination, interlocking means responsive to closure of said first switch for closing said second switch to effect operation of the machine, an electroresponsive circuit breaker normally connecting power to said first switch and therethrough and through said second switch when closed to the motor, and means responsive to a failure of said first and second switches or said interlocking means to operate properly for operating said circuit breaker to deenergize the motor power connections.

5. The combination according to claim 4, wherein the last mentioned means comprises electroresponsive timing means having an energizing circuit and said interlocking means comprises at least one electroresponsive device energizable through said first switch and having contacts for controlling said energizing circuit.

6. The combination according to claim 5, wherein said timing means comprises a pair of series connected timing relays each having timed operating contacts for controlling said circuit breaker so that if one of said relays fails the other relay will function to prevent operation of the machine.

7. In a control system for an electrical motor driven machine, the combination with a motor power control circuit and an operating control circuit, of a fail-safe control circuit, the last mentioned control circuit having means incorporated therein to insure that the machine is stopped in the event that a portion of the control system malfunctions, said means comprising a main circuit breaker for connecting power to the main power control circuit, timing means for controlling said main circuit breaker, and control means responsive to malfunctioning of the motor power control circuit for activating said timing means to operate said circuit breaker thereby to disconnect power from the motor power control circuit, said control means comprising interlocking means responsive to operation of at least a portion of the motor power control circuit for controlling said timing means.

8. The combination according to claim 7, wherein said control means additionally comprises means responsive to malfunctioning of said interlocking means for activating said timing means and therethrough said circuit breaker to disconnect power from the motor power control circuit.

9. In a control system for an electrical motor driven machine, the combination with a motor power control circuit and an operating control circuit, of a fail-safe control circuit, the last mentioned control circuit having means incorporated therein to insure that the machine is stopped in the event that a portion of the control system malfunctions, said means comprising a main circuit breaker for connecting power to the main power control circuit, timing means for controlling said main circuit breaker, control means responsive to malfunctioning of the motor power control circuit for activating said timing means to operate said circuit breaker thereby to disconnect power from the motor power control circuit, and means incorporated in said control means responsive to malfunctioning of the latter for activating said timing means to operate said circuit breaker thereby to disconnect power from the machine.

10. In a control system for an electrical motor driven machine, the combination with a main motor power control circuit having first and second electro responsive switches both of which must be operated to connect power therethrough to energize the machine and an operating control circuit for closing said switches, of a fail-safe control circuit, the last mentioned control circuit comprising means incorporated therein to insure that the machine is stopped in the event that a portion of the control system malfunctions, said means comprising a main circuit breaker for connecting power when closed to the main power control circuit, timing means having an energizing circuit for controlling said main circuit breaker, and control means responsive to malfunctioning of the control system for interruping said energizing circuit whereby to activate said timing means to open said circuit breaker.

11. The combination according to claim 10, wherein said last mentioned control circuit comprises electroresponsive means for initially completing said energizing circuit of said timing means, and said main power control circuit comprises an electroresponsive device operable conjointly with said first switch for interrupting said initial energizing circuit to activate said timing means and for preparing a second energizing circuit for the latter, and means responsive to operation of said second switch for operating said electroresponsive means to complete said second energizing circuit to deactivate said timing means, the timing period of the latter being longer than the time interval between interruption of said first energizing circuit and completion of said second energizing circuit to prevent opening of said circuit breaker during said interval.

12. The combination with a control system for power driven machines which control system comprises a power supply source and at least two serially connected electroresponsive switches each of which must be closed to connect power therethrough from said source to energize the machine and control means for initiating starting and stopping of the machine, of control means for detecting a faulty condition of either one of said switches, said control means comprising electroresponsive means responsive to initiation of starting of the machine during existence of such faulty condition for preventing energization of the machine and responsive to initiation of stopping of the machine during existence of such fautly condition for de-energizing the machine.

13. The combination with a control system for power driven machines which control system comprises a power supply source and at least two serially connected electroresponsive switches each of which must be closed to connect power therethrough to energize the machine and control means for operating said switches to initiate starting and stopping of the machine, of means for detecting a failure of one of said switches to operate properly, said control means comprising electroresponsive means responsive to initiation of starting of the machine during existence of such failure for disconnecting said power supply source from said switches to prevent energization of the machine and reseponsive to initiation of stopping of the machine during existence of such failure for disconnecting said power supply source from said switches to de-energize the machine.

References Cited in the file of this patent
UNITED STATES PATENTS

| | | |
|---|---|---|
| 2,444,186 | Elliot et al. | June 29, 1948 |
| 2,736,009 | Barnickel | Feb. 21, 1956 |
| 2,753,493 | Saives | July 3, 1956 |
| 2,786,989 | Smith | Mar. 26, 1957 |